Sept. 21, 1965 B. S. GLYDE ETAL 3,207,823

PRODUCTION OF FLATTENED TUBULAR PLASTIC FILM

Filed Sept. 11, 1964

INVENTOR.
BRIAN STANLEY GLYDE
KENNETH JOSEPH WHITBOURNE
WOJCIECH JAN FUDAKOWSKI

BY

ATTORNEYS

United States Patent Office

3,207,823
Patented Sept. 21, 1965

3,207,823
PRODUCTION OF FLATTENED TUBULAR PLASTIC FILM
Brian Stanley Glyde, Chalfont St. Peter, Wojciech Jan Fudakowski, London, and Kenneth Joseph Whitbourn, Watford, England, assignors to The Metal Box Company, Limited, Alperton, England, a corporation of England
Filed Sept. 11, 1964, Ser. No. 395,653
12 Claims. (Cl. 264—95)

This invention relates to the production of flattened tubular plastic film and is a continuation-in-part of application Serial No. 5,032, filed January 27, 1960, now abandoned.

The conventional method of making tubular plastic film consists of extruding the polymer in a molten state through a circular die. The tube thus formed in drawn away from the die by means of nip rollers and between the die and the nip rollers the tube is inflated by a suitable gas to a diameter greater than the diameter of the die (which has the effect of stretching the film transversely) while the nip rollers draw the film forward at a faster rate than the molten material is extruded from the die, so that the material is thereby stretched longitudinally. The polymer is extruded at a temperature which may be in the range of 150°–200° C., that is considerably in excess of the temperature of the ambient air, so that, shortly after it leaves the die and is blown up into a bubble by the internal air, the tempertaure of the polymer falls below its softening point and is no longer stretched either longitudinally or transversely.

No great difficulty is experienced in making tubing of reasonably uniform properties and of reasonably predictable dimensions if the operation is carried out slowly, but as the speed of production increases the cooling of the film becomes more critical from two points of view. First, it is difficult to cool the film sufficiently rapidly. Conventional cooling by ambient air or a stream of gas, usually air, applied to the outside of the tube results in slow cooling, the rate of extrusion must therefore be slow, and a considerable distance, usually of the order of ten to fifteen feet, between the die and draw rollers may be necessary to achieve a reasonable speed of production. Furthermore, slow cooling of some types of plastic film results in poor clarity, poor gloss, and loss of some desirable mechanical properties.

Secondly, as the rate of extrusion and the rate of cooling is increased as by blowing pre-cooled air from an air ring, it becomes increasingly difficult to ensure completely uniform cooling. If the cooling is not uniform then the gauge of the film and its physical properties will show undesirable variations. Various methods have been proposed to overcome this difficulty, such as, for example, the use of rotating air rings and the use of mandrels inside the film which may be kept cold by the circulation of water.

As the speed of extrusion is increased and the air velocities are increased to effect more rapid cooling, the mechanical stability of the film is affected and it is necessary to use various guides and mandrels.

The difficulty in achieving rapid cooling is increased as the thickness of the final film is increased.

It has been proposed to produce plastic film by a process in which the tubular film is supported internally by an internally cooled cylinder over which the film is drawn, rapid cooling being accomplished by an external water bath horizontally in line with the cylinder, the film being drawn between the cylinder and an annular flexible diaphragm which forms the base of the water bath. It has been found, however, that considerable uniaxial film orientation results from this process at speeds greater than those obtained in the prior proposals above mentioned.

It has further been proposed to produce plastic tubular film by passing an extruded plastic tube downwards through a tubular passageway which is interiorly bathed by a downwardly flowing cooling liquid which contacts the whole of the external surface of the tubular film as it passes through the passageway. This process suffers from the disadvantage that the tube must be inflated to nearly the exact size required by the tubular passageway before adequate and even cooling of the tube can take place. A series of accurately sized passageways is thus necessary for the production of different widths of tube. A further disadvantage is that it is necessary that the water film between the passageway and plastic film be kept very thin, so that even if heat transfer is aided by external cooling of the surface forming the passageway there is a limit to takeoff speed due to boiling of the water film which causes marking of the plastic film surface.

It is a main object of the present invention to provide a method of producing flattened tubular plastic film, particularly heavy gauge film (0.005 in. to 0.012 in.) and film from plastics (e.g., polypropylene) which benefit from rapid cooling, or from less crystalline plastic (such as polyvinyl chloride) which can be run at higher speeds, which method is largely free of the disadvantages of the processes referred to above, and is capable of producing flattened tubular film, particularly of heavy gauge, at a higher rate than has hitherto been found possible.

According to the invention it has been discovered that if plastic tubing is extruded from a circular die in the conventional manner vertically downwards, is taken up by nip rolls at a point below the point of extrusion, and is inflated with air to form a bubble, as in normal practice, it can be extruded at high speeds and cooled extremely rapidly and extremely uniformly if a thin uniform film of water, or other cooling liquid, is allowed to impinge upon the film at an appropriate level below the extrusion die with sufficient inwardly directed radial force to minimize wandering of the tube.

If the uniform film of water is allowed to impinge upon the film in this manner, then the water itself normally acts as a stabilising "mandrel," thus avoiding the need for an internal support or mandrel, and any tendency of the film to wander from side to side or to fluctuate dimensionally is automatically corrected. Desirably the necessary uniform film of cooling water is set up by an annular channel, the outer edge of the channel being higher than the internal edge, which allows the water to fall in a uniform film over a weir and down a frustro conical element. Provided the weir is accurately constructed and is correctly located in a horizontal plane, then the film of water flows uniformly from the edge of the weir to contact the plastic film and run down the surface of the plastic film to effect adequate cooling before the water breaks up into streams and driplets due to the accelerating influence of gravity.

The uniform film of cooling liquid may be produced by other methods, such as, for example, by forcing water through a slit orifice in an annular ring, the pressure of the water, the width of the slit and the angle of emergence of the film of water through the slit being such as to ensure that the water impinges on the film with a definite horizontal force component.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Figure 1:
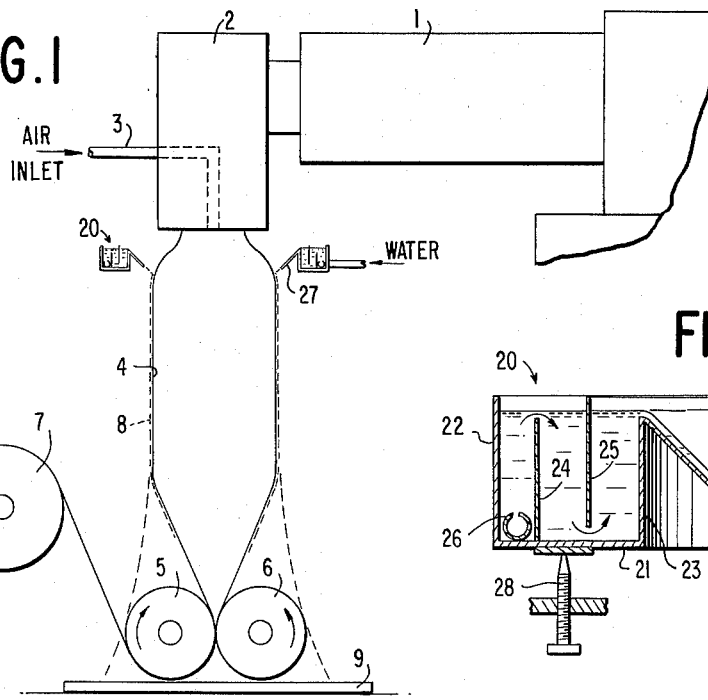
FIG. 1 is a diagrammatic illustration of apparatus for carrying the invention into effect.
Figure 1A:
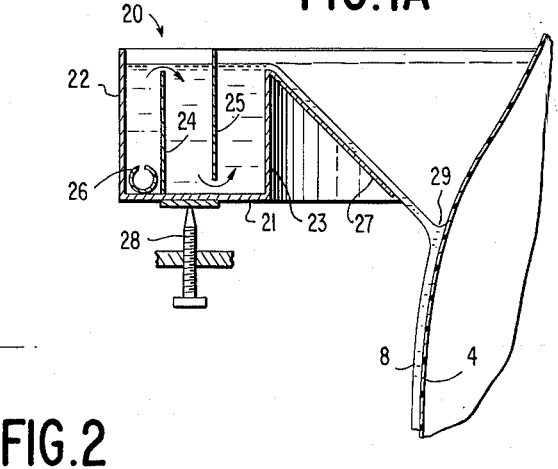
FIG. 1A is a fragmentary sectional view showing the cooling device of FIG. 1 enlarged.

Referring to the drawings, an extruding machine 1, FIG. 1, of known kind, is provided in a conventional manner with an extrusion nozzle 2 arranged to effect the continuous downward extrusion of a tube of molten plastic material such as polythene or polypropylene. The nozzle 2 is provided, in known manner, with an air delivering tube 3 through which air is passed into the extruded tube to effect inflation thereof to form a tubular plastic film 4 of desired predetermined diameter and gauge. After cooling to effect setting thereof the film is passed between cooperating opposed surfaces, shown as rotatable draw rollers 5, 6 which flatten the tube, and the flattened tube is wound onto a reel 7 or, if desired, it is cut into lengths.

Cooling of the inflated tube 4 is effected by a continuous, circular curtain 8 of liquid, preferably water, through which the inflated tube passes before reaching the draw rollers 5, 6. The cooling device is so arranged that the curtain initially travels inwardly towards the tube 4 impinges against the tube with an appropriate inwardly directed force, and then runs down the tube to be collected in a container 9 beneath the rollers 5, 6.

To obtain the full advantage of the process, the water curtain is circular and continuous between the weir of a cooling device 20 and the plastic tube 4. The level of contact of the water curtain with the plastic tube is, as shown in FIG. 1, in the vicinity of the level of inflation of the tube. The cooling device is designed, constructed and positioned for this purpose and also to ensure that the film of water falling from the point of impingement remains in contact with the plastic film and forms a continuous water film surrounding and in contact with the plastic film for as great a distance as possible from the point of impingement, thus giving the maximum cooling effect on the plastic film before it reaches the pinch rollers.

According to one embodiment of the invention the cooling device 20 comprises an annular channel 21 having a higher outer wall 22 than inner wall 23. Between these walls are annular, spaced baffles 24 and 25, the latter spaced from the bottom wall so as to cause water from inlet pipe 26 to flow upwardly in an outermost chamber between walls 22 and 24, downwardly in the central chamber between baffles 24 and 25, and upwardly in the innermost chamber between walls 25 and 23, as shown by the arrows. The upper edge of wall 23 is secured to an inwardly and downwardly directed frustro conical member 27 and forms a weir for the downwardly and inwardly directed continuous curtain of cooling water 8. The annular channel is supported at a proper height and levelled on screws 28 so as to space the lower edges of member 27 above and away from the portion of the tubing 4 which has reached nearly its maximum inflated diameter. The pressure of the inlet water is adjusted so that the curtain of water 8 strikes the inflated tube 4 with sufficient inwardly directed pressure to prevent the tube 14 from wandering. When this occurs a small ring or bead 29 of water is raised about the tube at the line of impact of the cooling water, creating a visible standing wave of liquid around the tube just above the position of impact. The momentum of the water impinging on the film definitely has a small stabilizing influence which depends, among other things, on the actual flow of water in gallons per minute for each linear inch of the periphery of the water curtain. In successful experiments the following measurements of water flow were obtained:

Water flow in gals./min./
   linear inch _____ 0.15, 0.19, 0.24, 0.28, 0.32, 0.37
Water force in gm./
   linear inch _____ 0.6, 1.1, 1.3, 1.6, 2.0, 2.3

The above values are not limiting but are critical in the sense that a definite, small inward pressure must be exerted to minimize tube wander. While these forces are small, they are quite significant but there are additional reasons for the improved stability of the film and in particular, the efficient method of cooling makes it possible to bring the take-up rollers much closer to the extrusion die, so that there is much less chance of the tube wandering.

In producing thin polythene film by the above described method and apparatus the controlling factors found to be suitable by experiment for two examples are listed in the following table:

|  | Example 1 | Example 2 |
| --- | --- | --- |
| Melt extrusion temperature | 200° C | 160° C. |
| Die orifice | .040″ | .025″. |
| Die diameter | 10″ | 2½″. |
| Extruder output | 380 lbs./hr | 72 lbs./hr. |
| Diameter of film | 14″ | 3.8″. |
| Gauge of film | 700 | 250. |
| Extrusion rate | 52 ft./min | 100 ft./min. |
| Diameter of bottom edge of weir. | 15″ | 4¼″. |
| Approximate distance of weir from tube. | ¾″ | ⅜″. |
| Approximate distance of edge of weir from die. | 5″ | 2½″. |
| Approximate rate of flow of water. | 15 gals./min./inch. | 4½ gals./min./inch. |
| Distance from die face to nip rolls. | 6 feet | 2½ feet. |
| Approximate cooling water force. | 2.1 gms./inch of circ. of water curtain. | 2.3 gms./inch of circ. of water curtain. |

Figure 2:
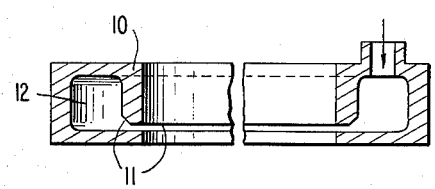
FIG. 2 is an elevation in section of another form of cooling device which may be embodied in the apparatus illustrated in FIG. 1.

According to another embodiment of the invention the cooling device comprises an annular housing 10, FIG. 2 provided around its inner face with a slit-like jet orifice 11 arranged to cause the curtain initially to be directed towards the tube at an angle to the axis of the tube. The orifice communicates with a chamber 12 to which cooling liquid is delivered in any suitable manner. The orifice 11 is radial, or at right angles, to the axis of the housing and as the housing is coaxial with the extruded tube the curtain will be directed towards the tube in a direction substantially radial or at right angles to the axis of the tube.

Figure 3:
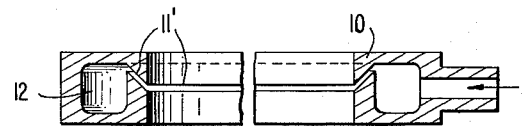
FIG. 3 is an elevation in section of an alternative form of cooling device.

An alternative form of cooling device is illustrated in FIG. 3, as being similar to that shown in FIG. 2 except that the orifice 11′ is directed downwards in the direction of movement of the tube 4 at an angle chosen to give the most stable impingement of the water curtain on the tube.

Figure 4:
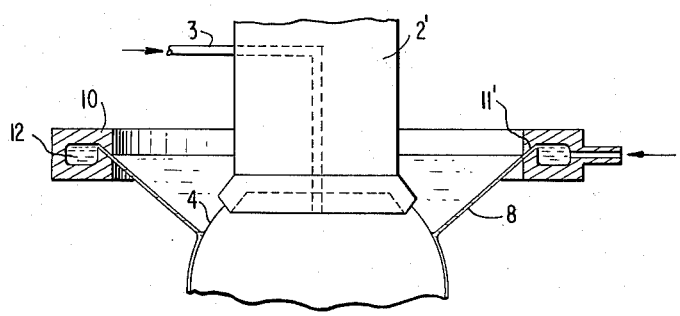
FIG. 4 is a diagrammatic illustration of the cooling device of FIG. 3 properly positioned with respect to an extruder nozzle.

FIG. 4 illustrates a modification of the apparatus in which the cooling device 10 of FIG. 3 is so positioned relative to the extrusion nozzle 2′ that the cooling liquid curtain is initiated at a position behind the point of extrusion of the tube from the nozzle, so that the position at which the tube is first engaged by the liquid curtain 8 is located close to the point of extrusion.

By use of the method and apparatus described above, it has been found possible for a large range of tube diameters to reduce to about 30 inches the distance from the nip between rollers 5, 6 and the die face of nozzle 2 thus permitting the entire installation to stand on the same floor. It has also been found, using a low density polythene that a flattened tubular film from 2 inches to 6 inches in width and of 150 to 900 gauge can be produced at an output rate of from 200 feet to 23 feet per minute according to the gauge of the film. In the apparatus by which the said results were obtained the width of the jet orifice 11′ was 0.005 inch and the water pressure adjusted to produce an unbroken curtain of water. The molten plastic tube was extruded through a die gap of 0.02 inch, one of the draw rollers being a steel roller and the other a rubber coated roller.

Further, by the use of the method and apparatus described herein with reference to the accompanying drawings it has been found that at the rates mentioned in the preceding paragraph it is possible with heavy gauge (0.005 in. to 0.012 in.) plastic film, particularly film made of low density polyethylene, to produce a finished product the gloss and "see-through" properties of which are improved having regard to films produced by methods and apparatus of the kind employed prior to the present invention. It is also found that even when producing lighter gauge films (0.001 in. to 0.005 in.) from medium clarity, low density polyethylene the clarity and gloss of the films approaches the quality of that expected from so-called "high-clarity" grades.

The method and apparatus of the invention avoid the need for internal mandrels and internal coolants, the external cooling liquid serving to minimize wander of the tube being produced and maintaining dimensions and desired finish characteristics. It will be evident that the materials utilized may include other thermoplastics than those named and that the coolant liquid may be other than water. Obviously the temperature of the coolant may be varied as suited to the particular film being produced.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. The method of producing flattened tubular plastic film which comprises the steps of continuously extruding a laterally unsupported tube of molten plastic material in a generally downward direction about a substantially vertical extrusion axis, inflating the tube at a level near the extrusion orifice, and solidifying the inflated tube by directing an annular stream of cooling liquid onto the tube substantially at said level of inflation of the tube, said stream of cooling liquid being of such force and dimensions as to engage the tube with a continuous, circular curtain of liquid having radial inward pressure sufficient to minimize lateral wandering of the tube from the axis of extrusion.

2. A method according to claim 1 wherein said inward pressure of the circular curtain of cooling liquid lies in the range from approximately 0.6 to approximately 2.3 grams per linear inch.

3. A method according to claim 1 wherein said inward pressure of the circular curtain of cooling liquid is approximately 2.3 grams per linear inch.

4. A method according to claim 1 wherein said inward pressure of the circular curtain of cooling liquid is at least 0.6 grams per linear inch.

5. The method according to claim 1 wherein said stream of cooling liquid is of such force as to raise a bead of cooling liquid about the tube above the area of impact of the stream as it engages the tube.

6. The method according to claim 1 wherein said stream of cooling liquid is water directed against the tube from a distance greater than the thickness of said stream.

7. The method of producing flattened tubular plastic film which comprises the steps of continuously extruding a laterally unsupported tube of molten plastic material having an extrusion axis extending in a generally downward direction, inflating the tube at a level near the extrusion orifice, solidifying the inflated tube by directing onto the tube substantially at said level of inflation having an annular stream of cooling liquid which engages the tube with a radially inward pressure sufficient to minimize wandering of the tube from the axis of extrusion and sufficient to form a substantially continuous and unconfined, free-falling, circular curtain surrounding the tube, and subsequently at a lower level passing the inflated tube between opposed cooperating surfaces to flatten the tube.

8. Apparatus for producing flattened tubular plastic film, comprising means arranged at an upper level continuously to extrude a laterally unsupported tube of molten plastic material in a downward direction, means to inflate the extruded tube substantially at said upper level, means to flatten the inflated tube at a lower level, and means encircling the formed tube substantially at the level of extrusion to direct a continuous circular curtain of cooling liquid onto the inflated tube substantially between the level of initial inflation thereof and the level at which the tube attains its maximum diameter, said curtain of liquid having uniform, radial, inward pressure in each incremental area about its circumference sufficient to minimize wandering of the tube and to cause the liquid to flow as a continuous, cylindrical and unobstructed stream supported only by the tube, said cooling liquid directing means being outwardly spaced from the path of the tube by a distance greater than the thickness of said curtain of cooling liquid.

9. Apparatus according to claim 8 wherein said cooling liquid directing means includes a hollow annular housing, larger in diameter than said extrusion means and said inflated tube, lying in a substantially horizontal plane surrounding the path of the tube and connected with a pressure source of liquid supply, said housing having a circular, horizontally disposed slit-like orifice the height of which is about 0.005 inch, said orifice being spaced from the path of the tube by a distance such as to avoid the curtain breaking up before effecting contact with the tube.

10. Apparatus according to claim 9 wherein the slit-like jet orifice is directed downward in the direction of movement of the tube.

11. Apparatus according to claim 8 wherein said cooling liquid directing means includes a substantially horizontal, annular trough having an outer wall higher than its inner wall and a frustro-conical member secured to the upper edge of the inner wall and directed downwardly and inwardly but spaced from the extruded tube, and means for directing a cooling liquid under pressure to said trough.

12. Apparatus for producing flattened tubular plastic film, comprising means continuously to extrude a laterally unsupported tube of molten plastic material in a downward direction from an extrusion orifice having a substantially vertical extrusion axis, means to inflate the extruded tube at a level close to said extrusion orifice and means to direct onto the inflated tube substantially at said level a continuous ring of cooling liquid having uniform radial inward pressure about its circumference sufficient to minimize wandering of the tube from the axis of extrusion.

References Cited by the Examiner

UNITED STATES PATENTS 3,090,998   5/63   Heisterkamp et al. _____ 264—95

ROBERT F. WHITE, *Primary Examiner.*